United States Patent
Dhammawat et al.

(10) Patent No.: US 9,414,354 B2
(45) Date of Patent: Aug. 9, 2016

(54) SYSTEM AND METHOD FOR LOCATION REPORTING IN AN UNTRUSTED NETWORK ENVIRONMENT

(71) Applicant: CISCO TECHNOLOGY, INC., San Jose, CA (US)

(72) Inventors: Abhishek Dhammawat, Bangalore, IN (US); Arun Kavunder, Wilmington, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/844,558

(22) Filed: Sep. 3, 2015

(65) Prior Publication Data
US 2016/0057728 A1 Feb. 25, 2016

Related U.S. Application Data

(63) Continuation of application No. 14/466,747, filed on Aug. 22, 2014, now Pat. No. 9,179,436.

(51) Int. Cl.
*H04W 4/02* (2009.01)
*H04W 64/00* (2009.01)
(Continued)

(52) U.S. Cl.
CPC ............ *H04W 64/006* (2013.01); *H04W 4/021* (2013.01); *H04W 4/027* (2013.01);
(Continued)

(58) Field of Classification Search
CPC . H04W 64/003; H04W 64/00; H04W 64/006; H04W 4/02; H04W 4/023; H04W 4/025
USPC .......... 455/422.1, 456.1, 456.2, 456.3, 456.5, 455/456.6
See application file for complete search history.

(56) References Cited

U.S. PATENT DOCUMENTS 8,837,360 B1 9/2014 Mishra et al.
9,179,436 B1 11/2015 Dhammawat et al.
(Continued)

FOREIGN PATENT DOCUMENTS

WO WO2014/005652 1/2014

OTHER PUBLICATIONS

Kaufman, C., et al., "Internet Key Exchange Protocol Version 2(IKEv2)," Internet Engineering Task Force (IETF) RFC 5996; Sep. 2010.

(Continued)

*Primary Examiner* — Siu Lee
(74) *Attorney, Agent, or Firm* — Patent Capital Group

(57) ABSTRACT

An example method is provided and may include retrieving by a user equipment (UE) an access point (AP) Media Access Control (MAC) address for an AP to which the UE is connected; reporting location information for the UE to an evolved Packet Data Gateway over an SWu interface using Internet Key Exchange version 2 (IKEv2) protocol, wherein the location information includes, at least in part, a UE location in GPS coordinates, a service set identifier, the retrieved AP MAC address and cell identity information for the UE; and populating a location database with the location information. The method can include embedding the location information in an identity initiator (Idi) of an IKE Authentication Request (IKE_AUTH_REQ) message using a Network Access Identifier (NAI) and communicating the location information from the ePDG to a PGW over an S2b interface using a private extension information element of GPRS Tunneling Protocol version 2 (GTPv2).

20 Claims, 10 Drawing Sheets

(51) Int. Cl.
*H04W 12/04* (2009.01)
*H04W 12/06* (2009.01)

(52) U.S. Cl.
CPC ............. *H04W 4/028* (2013.01); *H04W 12/04* (2013.01); *H04W 12/06* (2013.01); *H04W 64/00* (2013.01); *H04W 64/003* (2013.01)

(56) References Cited

U.S. PATENT DOCUMENTS

| | | | |
|---|---|---|---|
| 2003/0216143 | A1 | 11/2003 | Roese et al. |
| 2009/0149194 | A1* | 6/2009 | Howard ............... H04W 64/003 455/456.1 |
| 2010/0125732 | A1* | 5/2010 | Cha ....................... H04L 63/107 713/166 |
| 2010/0159945 | A1* | 6/2010 | Brisebois ................ H04W 4/02 455/456.1 |
| 2010/0323700 | A1 | 12/2010 | Bachmann et al. |
| 2011/0026435 | A1 | 2/2011 | Weniger et al. |
| 2011/0235532 | A1 | 9/2011 | Alizadeh-Shabdiz et al. |
| 2013/0058275 | A1 | 3/2013 | Melia et al. |
| 2013/0078998 | A1 | 3/2013 | Rui et al. |
| 2013/0237243 | A1 | 9/2013 | Kuehnel et al. |
| 2013/0265997 | A1 | 10/2013 | Gu |
| 2015/0172981 | A1 | 6/2015 | Janakiraman |
| 2015/0195771 | A1 | 7/2015 | Hurtta |

OTHER PUBLICATIONS

ETSI TS 123 401 V9.5.0 (Jun. 2010) Technical Specification: LTE; General Packet Radio Service (GPRS) enhancements for Evolved Universal Terrestrial Radio Access Network (E-UTRAN) access (3GPP TS 23.401 version 9.5.0 Release 9); ETSI, European Telecommunications Standards Institute, F-06921 Sophia Antipolis Cedex—France, Jun. 2010; 261 pages.

"ETSI TS 129 275 V9.8.0 (Apr. 2012) Technical Specification: Universal Mobile Telecommunications System (UMTS); LTE; Proxy Mobile IPv6 (PMIPv6) based Mobility and Tunnelling protocols; Stage 3 (eGPP TS 29.275 version 9.8.0 Release 9);" ETSI, European Telecommunications Standards Institute, F-06921 Sophia Antipolis Cedex—France, Apr. 2012; 76 pages.

"ETSI TS 129 274 V9.8.0 (Oct. 2011) Technical Specification: Universal Mobile Telecommunications System (UMTS); LTE; 3GPP Evolved Packet System (EPS); Evolved General Packet Radio Service (GPRS) Tunnelling Protocol for Control Plane (GPTv2-C); Stage 3 (eGPP TS 29.274 version 9.8.0 Release 9);" ETSI, European Telecommunications Standards Institute, F-06921 Sophia Antipolis Cedex—France, Oct. 2011; 180 pages.

"ETSI TS 123 402 V9.8.0 (Mar. 2011) Technical Specification: Universal Mobile Telecommunications System (UMTS); LTE; Architecture Enhancements for Non-3GPP Accesses (3GPP TS 23.402 version 9.8.0 Release 9);" ETSI, European Telecommunications Standards Institute, F-06921 Sophia Antipolis Cedex—France, Mar. 2011; 201 pages.

"ETSI TS 123 003 V9.8.0 (Oct. 2011) Technical Specification: Digital Cellular Telecommunications System (Phase 2+); Universal Mobile Telecommunications System (UMTS); Numbering, addressing and identification (3GPP TS 23.003 version 9.8.0 Release 9);" ETSI, European Telecommunications Standards Institute, F-06921 Sophia Antipolis Cedex—France, Oct. 2011; 79 pages.

"ETSI TR 102 528 V1.1.1 (Oct. 2006) Technical Report: Lawful Interception (LI); Interception Domain Architecture for IP Networks;" ETSI, European Telecommunications Standards Institute, F-06921 Sophia Antipolis Cedex—France, Oct. 2006; 38 pages.

EPO Feb. 5, 2016 Extended Search Report and Written Opinion from European Application No. 15181006.6; 12 pages.

Alcatel-Lucent, et al., "Solutions for the location related Key Issue," 3GPP, S2-150920, SA WG2 Meeting #108, Apr. 13-17, 2015, San Jose Del Cabo, Mexico; 4 pages; XP050942801.

Cisco Systems, Inc., "ePDG Administration Guide, StarOS Release 16," Jul. 31, 2014, 99 pages, XP055200115.

"3GPP TR 23.771 V1.0.0 (Jun. 2015) Technical Report: 3rd Generation Partnership Project; Group Services and System Aspects; Study on System Impacts of IMS Emergency Sessions over WLAN (Release 13)," 3GPP; 650 Route des Lucioles, Sophia Antipolis, Valbonne—France, Jun. 2015; 21 pages.

Huawei, "Solution: How LRF Retrieve Location Information for s2b," 3GPP, S2-150805, SA WG2 Meeting #108, Apr. 13-17, 2015, San Jose Del Cabo, Mexico; 10 pages; XP050942747.

* cited by examiner

SYSTEM AND METHOD FOR LOCATION REPORTING IN AN UNTRUSTED NETWORK ENVIRONMENT

RELATED APPLICATION

This Application is a continuation (and claims the benefit of priority under 35 U.S.C. §120) of U.S. application Ser. No. 14/466,747, filed Aug. 22, 2014, entitled "SYSTEM AND METHOD FOR LOCATION REPORTING IN AN UNTRUSTED NETWORK ENVIRONMENT," Inventors Abhishek Dhammawat, et al. The disclosure of the prior application is considered part of (and is incorporated in its entirety by reference in) the disclosure of this application.

TECHNICAL FIELD

This disclosure relates in general to the field of communications and, more particularly, to a system and method for location reporting in an untrusted network environment.

BACKGROUND

Networking architectures have grown increasingly complex in communications environments, particularly mobile wireless environments. Mobile communication networks have grown substantially in subscriber base as end users become increasingly connected to mobile wireless environments to conduct business, to shop, to interact with friends, to maintain personal finances, and to perform many other daily functions. As the number of mobile subscribers increases, efficient management of communication resources becomes more critical. In some instances, management of resources depends on service providers understanding the locations where subscribers are connected to the network. For legal intercept, subscriber location is also required. There are significant challenges in learning the locations of subscribers, particularly with regard to untrusted connection points within the network.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and may include retrieving by a user equipment (UE) an access point (AP) Media Access Control (MAC) address for an AP to which the UE is connected, wherein the AP is in an untrusted Internet Protocol (IP) access network; reporting location information for the UE to an evolved Packet Data Gateway (ePDG) over an SWu interface using Internet Key Exchange version 2 (IKEv2) protocol, wherein the location information includes, at least in part, a location of the UE in Global Positioning System (GPS) coordinates, a service set identifier (SSID) for the untrusted IP access network, the retrieved AP MAC address and cell identity (ID) information for the UE; and populating a location database with the location information for the UE, wherein the location database includes, at least in part, location information for other UE in the untrusted IP access network.

The method can include embedding the location information for the UE using a Network Access Identifier (NAI) as part of an identity initiator (Idi) of an IKE Authentication Request (IKE_AUTH_REQ) message communicated over the SWu interface. In some cases the location database can be maintained by a Policy and Charging Rules Function (PCRF). In other cases, the location database can be maintained external to the PCRF. The method can include communicating the location information for the UE from the ePDG to a packet data network (PDN) gateway (PGW) over an S2b interface using a private extension information element (IE) of General Packet Radio Service (GPRS) Tunneling Protocol version 2 (GTPv2); and communicating the location information from the PGW to the PCRF over a Gx interface. In some instances, the location database can further include at least one of: a device name for the UE; and a physical address of the UE.

In some cases, the method can include comparing, based on the AP MAC address contained in the location information for the UE, the reported location of the UE to locations of UE previously stored in the location database that have previously connected to the AP; and identifying the location of the UE contained in the location information for the UE as potentially invalid if it is not near corresponding locations for the UE previously stored in the location database that have previously connected to the AP. In still other cases, the method can include comparing the reported location of the UE contained in the location information for the UE to locations of UE previously stored in the location database; and identifying the AP MAC address contained in the location information for the UE as potentially invalid if it does not match corresponding AP MAC addresses for the UE previously stored in the location database that have corresponding locations near the location of the UE.

Example Embodiments

Figure 1:
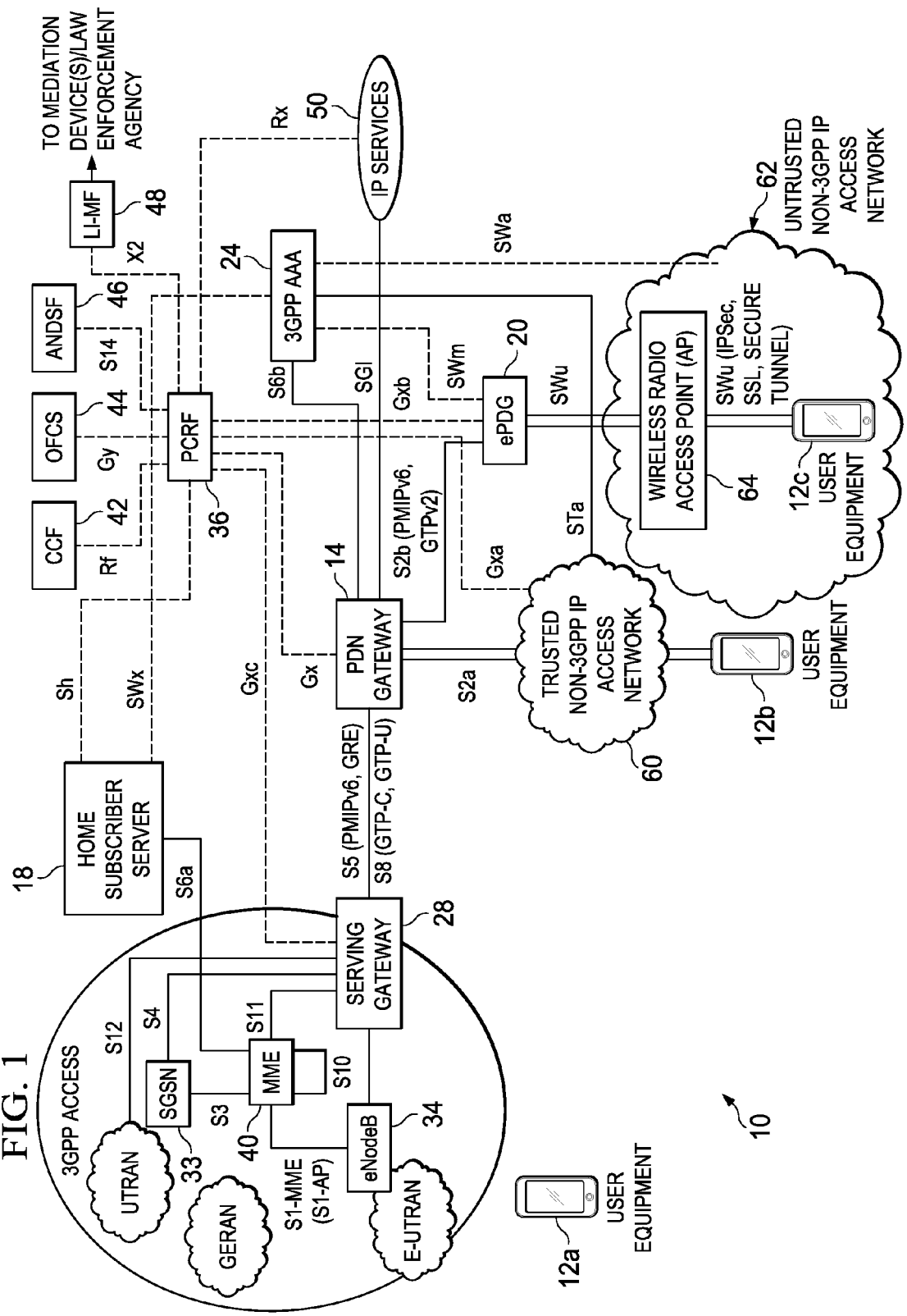
FIG. 1 is a simplified block diagram illustrating a communication system to facilitate location reporting in an untrusted network environment according to one embodiment of the present disclosure.

Turning to FIG. 1, FIG. 1 is a simplified block diagram illustrating a communication system 10 to facilitate location reporting in an untrusted network environment according to one embodiment of the present disclosure. This particular configuration may be tied to the 3rd Generation Partnership Project (3GPP) Evolved Packet System (EPS) architecture, also sometimes referred to as the Long-term Evolution (LTE) EPS architecture. Alternatively, the depicted architecture may be applicable to other environments equally.

The example architecture of FIG. 1 may include multiple end users operating user equipment (UE) 12a-12c and packet data network (PDN) gateway (PGW) 14, which may have a logical connection to a serving gateway (SGW) 28. Also provided are a home subscriber server (HSS) 18, a 3GPP Authentication, Authorization and Accounting (AAA) element 24 and a serving gateway support node (SGSN) 33. SGW 28 also has a logical connection to an eNodeB 34, a Mobility Management Entity (MME) 40 and to SGSN 33. Both SGW 28 and PGW 14 can interface with a Policy and Charging Rules Function (PCRF) 36. As used herein in this Specification, the terms 'user equipment,' 'user' and 'subscriber' are interchangeable. PGWs 14 may provide Internet Protocol (IP) connectivity access network (IP-CAN) session connectivity for UEs to external packet data networks (PDNs), such as, for example, IP services 50. Also shown in FIG. 1 are a Charging Collection Function (CCF) 42, an Offline Charging System (OFCS) 44, an Access Network Discovery and Selection Function (ANDSF) 46 and a Lawful Intercept Mediation Function (LI-MF) 48; each of which may interface with PCRF 36.

Each of the elements of FIG. 1 may couple to one another through simple interfaces (as illustrated) or through any other suitable connection (wired or wireless), which provides a viable pathway for network communications. Additionally, any one or more of these elements may be combined or removed from the architecture based on particular configuration needs. For example, communication system 10 may include a configuration capable of transmission control protocol/Internet protocol (TCP/IP) communications for the transmission or reception of packets in a network. Communication system 10 may also operate in conjunction with a user datagram protocol/IP (UDP/IP) or any other suitable protocol where appropriate and based on particular needs.

In more general terms, 3GPP defines the Evolved Packet System (EPS) as specified in Technical Specification (TS) 23.401, TS 23.402, TS 29.274, etc. The EPS generally consists of UE access networks and an Evolved Packet Core (EPC). Access networks may be 3GPP access networks including legacy access networks such as GSM EDGE Radio Access Network (GERAN), UMTS Terrestrial Radio Access Network (UTRAN), also known as 3G, or LTE access networks such as Evolved UTRAN (E-UTRAN), also known as 4G/LTE or LTE-Advanced (LTE-A), or they may be non-3GPP IP access networks such as digital subscriber line (DSL), Cable, WiMAX, code division multiplex access (CDMA) 2000, WiFi, or the Internet.

Non-3GPP IP access networks can be included in communication system 10 and can divided into trusted and untrusted segments such as trusted non-3GPP IP access network 60 and untrusted non-3GPP IP access network 62, respectively. Note trusted non-3GPP IP access network 60 may be interchangeably referred to herein in this Specification as a 'trusted IP access network' and untrusted non-3GPP IP access network 62 may be interchangeably referred to herein as an 'untrusted IP access network'. Untrusted IP access network 62 may include a wireless radio access point 64. Note wireless radio access point 64 may be referred to interchangeably in this Specification as a wireless access point (WAP) or access point (AP). Untrusted IP access network 62 may also provide Internet connectivity via AP 64 for UE connected thereto. In general, trusted IP access networks support mobility, policy and AAA interfaces to the EPC, whereas untrusted IP access networks do not. For trusted IP access network 60, a viable relationship exists between a service provider and the EPC. In contrast, access from untrusted access network 62 is managed via an evolved packet data gateway (ePDG) 20, which provides for Internet Protocol Security (IPsec) security associations to UE via untrusted IP access network 62 including AP 64.

IPsec can use cryptographic security services to protect communications over IP networks. For example, communications over an internet or wireless local access network (WLAN) between UE 12a-12c and ePDG 20, PGW 14, etc. IPsec can support network-level peer authentication, data origin authentication, data integrity, data confidentiality (encryption), and replay protection. Implementation of IPsec can be based on Internet Engineering Task Force (IETF) standards. As shown in FIG. 1, ePDG 20 may have a logical connection to PGW 14 through a S2b interface and to AAA element 24 through a SWm interface to support mobility and AAA interfaces to the EPC. The SWm interface may provide an interface for authenticating and authorizing UE attaching to untrusted access network 62. In some instances when a PGW may not be present in the system, ePDG may have a logical connection to PCRF 36 through a DIAMETER-based Gxb interface, however, it should be noted that the Gxb interface is largely unused when a PGW (e.g., PGW 14) is present. UE 12c (or any other UE seeking connection to the EPC) may interface with untrusted IP access network 62 and ePDG 20 via AP 64 over a SWu interface. In various embodiments, security for the SWu interface can be achieved using IPSec, Secure Sockets Layer (SSL), or any other secure tunnel. As shown in FIG. 1, ePDG may interface with AP 64 through the SWu (IPSec, SSL, secure tunnel) interface and AP 64 may interface to UE (e.g., UE 12c) through the SWu interface.

In general terms, wireless radio AP 64 represents a radio access point device that can allow UEs to connect to a wired network using WiFi, Bluetooth™, WiMAX or any other appropriate standard. Hence, the broad term 'radio access point' can be inclusive of a WAP, a hotspot, a WiFi array, a wireless bridge (e.g., between networks sharing same SSID and radio channel), a WLAN or any other suitable access device, which may be capable of providing suitable connectivity to a given UE (e.g., UE 12c, etc.). In certain cases, AP 64 can connect to a router (via a wired network), which can relay data between UE 12c and other UEs of the network. In some embodiments, AP 64 may be included in an automobile or other mobile transportation device to provide suitable connectivity to a given UE (e.g., UE 12c, etc.).

Also provided in the architecture of FIG. 1 is a series of interfaces, which can offer mobility, policy control, AAA functions and/or charging activities (offline and online) for various network elements. For example, interfaces can be used to exchange point of attachment, location, and/or access data for one or more end users, for example, users operating UE 12a-c. Resource, accounting, location, access network information, network address translation (NAT) control, etc. can be exchanged using a remote authentication dial in user service (RADIUS) protocol or any other suitable protocol where appropriate. Other protocols that can be used in communication system 10 can include DIAMETER-based protocols, a service gateway interface (SGI), a terminal access controller access-control system (TACACS), TACACS+, Generic Route Encapsulation (GRE), etc.

As shown in FIG. 1, a DIAMETER-based interface, Rx, may be maintained between IP services 50 and PCRF 36 for communicating subscriber information between IP services 50 and PCRF 36. In various embodiments, IP services can include an IP multimedia subsystem (IMS) to provide IP multimedia services to subscribers. PCRF 36 may provision policy charging and control (PCC) rules for PGW 14 using a DIAMETER-based Gx interface and PGW 14 may communicate subscriber information to PCRF 36 over the Gx interface. Communication system 10 may be configured with additional DIAMETER-based interfaces to manage policy and control between various elements of the system 10.

For example, DIAMETER-based interfaces Gxa and Gxc may be maintained between the PCRF 36 and trusted IP access network 60 and SGW 28, respectively. Further DIAMETER-based interfaces may include SWx (interfacing AAA element 24 and the HSS 18), STa (interfacing AAA element 24 and a trusted non-3GPP IP access point (not shown)) and SWa (interfacing AAA element 24 and untrusted non-3GPP AP 64). Note the SWa interface may provide for interfacing with HSS 18 via AAA element 24. Various additional interfaces may include S6a between HSS 18 and MME 40, S6b between AAA element 24 and PGW 14, S2a between PGW 14 and trusted IP access network 60; S2b between PGW 14 and ePDG 20 and SWm between ePDG 20 and AAA element 24. The S2b interface may support protocols including Proxy Mobile IP version 6 (PMIPv6) or General Packet Radio Service (GPRS) Tunneling Protocol (GTP). Other signaling interfaces are illustrated between various components of FIG. 1, according to 3GPP standards, which are not discussed in detail for purposes of brevity.

Before detailing further operations and infrastructure of various elements of FIG. 1, certain contextual information is provided to offer an overview of some problems that may be encountered for location reporting. Such information is offered earnestly and for teaching purposes only and, therefore, should not be construed in a way to limit the broad applications for the present disclosure. Currently, there is no defined way of communicating location information of a given UE to an ePDG, PGW and PCRF when the UE is in an untrusted non-3GPP IP access network and is accessing the LTE EPC via the ePDG. However, service providers have a need to understand where their customers connect via untrusted APs (e.g., untrusted WiFi APs) for coverage reasons. They also have a need to correlate the performance of these untrusted APs over time and use that information along with policy information to provide expected service levels to subscribers. Additionally for cloud or virtual EPC environments, it may be useful to have AP and/or UE location information to determine which and/or how many users/UE are connected to APs in order for a content service provider (CSP) or telephone company to perform data analytics for the system. The data analytics may be used to provide system, subscriber or AP optimizations for communication system 10.

Location information of a user is also important for tracking the user when enforcing lawful intercept (LI). In the LTE EPC, LI support is a mandate required by some government bodies and thus the PGW supports X2 function of LI and the PCRF supports the X3 function of LI. In the event that an operator wants to have an LI function operating on the PGW for tracking UE connecting to it via an untrusted WiFi, UE location information and/or the AP information to which the user/UE is connected to over wireless/WiFi is needed in order to provide lawful intercept enforcement.

As noted, however, there is currently no defined method for the overall communication of UE location information in an untrusted access network to LTE EPC nodes when connected via the ePDG. Also there is no defined way in Internet Key Exchange version 2 (IKEv2) to communicate UE location to the ePDG. As defined by the Internet Engineering Task Force in RFC 5996, IKEv2 may be used, among other things, to set-up a security association in IPSec for a UE connecting via the ePDG.

In accordance with one embodiment, communication system 10 can overcome the aforementioned shortcomings (and others) by providing a solution for receiving UE location information for a given UE (e.g., UE 12c) connected to AP 64 in untrusted non-3GPP IP access network 62 using the SWu interfaces. UE 12c may retrieve the Service Set Identifier (SSID) for untrusted non-3GPP IP access network 62 and the Media Access Control (MAC) address of AP 64 through which it may be connected to ePDG 20. The UE may report the SSID and the MAC address of AP 64 and location for the UE to ePDG 20 over the SWu interface. Cell identity (ID) information for the UE can also be added to the reporting received from the UE to improve reliability of the provided location information. As discussed in further detail below, the cell ID information can include information for one or more macro cells being served by or seen by the UE (e.g., via one or more measurement reports for one or more cell signal measurements performed by UE). Location of the UE itself can be reported using Global Positioning System (GPS) coordinates of the UE (provided the UE is GPS enabled). In various embodiments, UE 12a-12c may be GPS enabled and thus capable of providing their GPS coordinates. Thus, GPS coordinates of the UE, SSID and AP MAC address of the AP to which the UE is connected and cell ID information of the UE can be used to provide location information reporting for the UE.

Collecting cell ID information, UE location coordinate information, SSID and the MAC address of AP(s) (e.g., multiple APs can be present) in the untrusted IP access network from all users connecting to the APs over time and coupling this with session performance information as a form of crowd sourcing information can allow service providers to build a location and/or performance database of AP(s) in the network. Harnessing this information can be used to build location and mobility information about subscribers to help in planning network coverage and roll outs. Crowd sourcing location data using the solution provided by communication system 10 can also improve the confidence level of locating APs based on their corresponding MACs, which in turn can be used to provide legal intercept to law enforcement agencies with location information when UEs under LI intercept use untrusted wireless/WiFi APs.

In various embodiments, the location database can include SSID information, AP MAC information; UE GPS coordinate information for UE connected to an AP; cell ID information for UE connected to the AP; UE device name information and/or address information of the UE and/or AP. The location database can be maintained by PCRF 36 or any other entity/element in the system, which can receive UE location information per CSP deployment and populate (e.g., update and/or append) the database with the received UE location information. Table 1 illustrates an example organization of information, which can be provided in the location database.

TABLE 1

| SSID | AP MAC | GPS Coordinates | Cell ID | Device Name | Address |
|---|---|---|---|---|---|
| <SSID of network> | <AP MAC Address> | <UE GPS Coordinates> | <UE Cell ID Information> | <UE Device Name/Information> | <AP/UE Physical Address or Approx. Physical Address> |

In addition to populating/storing UE location information in the location database for UE accessing the LTE EPC via ePDG 20, the cluster information maintained for different devices/UE in the location database can be utilized for verification of incoming new records for APs/UEs with existing AP/UE records. For example, the cluster information maintained in the database can be used to determine if a device may be tampering with the MAC address of a given AP when communicating location information for a given UE. If the GPS coordinates of a given UE do not map to or are not close to the majority of records of other UE that have previously connected to a same AP to which the UE reports that it is connected, then it can determined that the MAC address of the AP may have been tampered with during the location reporting. Not only may the cluster information maintained for different devices be used for data mining to provide for reliability against AP MAC address tampering, but the cluster information may also be used to detect improper locations being reported for UE.

Determinations of improper locations reported for a UE and/or MAC address tampering can be made based on AP MAC address matching as well as GPS coordinate analysis between an AP MAC address and GPS coordinate information reported by the UE and AP MAC addresses and GPS coordinates stored in the database as reported for other UE. In various embodiments, there can also be an algorithm in the entity/element that maintaining the location database to update an operator/CSP regarding whether received location information is accurate or not based on previously received similar records from other devices.

In some embodiments, if a given device/UE is not able to send its GPS information (e.g., it is not GPS enabled) then cell ID information, SSID and AP MAC address information provided in the location information can be utilized to determine a location of the UE from previous records stored for other devices having matching AP MAC address information and/or cell ID information. Additionally, in various embodiments, the cluster information maintained in the location database may be maintained and/or utilized for different ePDGs and/or PGWs from other communication networks, which may be provided to the location database from a cloud. In various embodiments, SSID can be used to identify a basic service set (BSS) and/or an extended service set (ESS) of untrusted non-3GPP IP access network 62.

GPS coordinates are typically displayed/represented in a first format, which includes the hemispheres, hours of degree and a decimal value representing the minutes of degree (e.g., N 25 07.450'). In a second format, the minutes of degrees can be represented as a whole number and the seconds are represented as a whole number (e.g., N 25 07' 27"). In yet a third format GPS coordinates can be represented as pure decimal numbers (e.g., 25.124167), which can be very useful for doing coordinate math such as calculating distances. In various embodiments, any of the above formats can be selected to be used in the location information reported for a UE as the format may be a stored as a string. Thus any GPS coordinate format may be chosen based on UE and ePDG agreement per CSP/operator deployment.

Cell ID information can include cell information for one or more 3GPP macro cells that may be either served by and/or seen by a UE (e.g., via one or more measurement reports for one or more cell signal measurements performed by UE) within communication system 10. In various embodiments, cell ID information may contain, but not be limited to, radio type (e.g., GSM, CDMA, UMTS, LTE, LTE-A, etc.), Mobile Country Code (MCC), Mobile Network Code (MNC), serving Location Area Code (LAC), serving cell ID (CID), serving cell signal strength, serving physical cell ID, serving cell timing advance, seen LAC (e.g., for each of one or more cells/LACs seen by a given UE), seen CID, seen cell signal strength, seen cell physical cell ID seen cell timing advance, etc. Table 2 illustrates example cell ID information that may be reported by a UE.

TABLE 2 radio:gsm|cdma|umts|lte|lte-a
mcc: xxx
mnc: yyy
cells:[{srv_lac:abc, srv_cid:def, srv_sigstr:ghi, srv_phycid:jkl, srv_time_adv:mno},
{seen_lac:abc, seen_cid:def, seen_sigstr:ghi, seen_phycid:jkl, seen_time_adv:mno},
...
{seen_lac:abc, seen_cid:def,seen_sigstr:ghi, seen_phycid:jkl, seen_time_adv:mno},
{seen_lac:abc, seen_cid:def, seen_sigstr:ghi, seen_phycid:jkl, seen_time_adv:mno}]

In various embodiments, address information can be represented as a physical address and/or approximate physical address information of the UE and/or AP. In various embodiments, the address information may be accessed based on publicly available information provided to or by a CSP/operator. In various embodiments, UE device name can be represented by International Mobile Subscriber Identity (IMSI) of the user associated with the UE, Mobile Subscriber Integrated Services Digital Network-Number (MSISDN), or other similar identification of the device/UE.

In one instance, wireless radio AP 64 may use Extensible Authentication Protocol Authentication and Key Agreement (EAP-AKA) to initiate a session for UE 12c (or any other UE seeking to initiate a session with the AP). During operation, UE 12c may retrieve the MAC address of AP 64 and may include this in the user name sent over SWu to AP 64, which is typically part of the ID initiator (Idi) in an Internet Key Exchange (IKE) authentication request message (e.g., IKE_AUTH_REQ) communicated to the AP during EAP-AKA authentication. For EAP-AKA authentication, the typical format of the Root Network Access Identifier (NAI) (e.g., identity of a user associated with a UE) per 3GPP TS 23.003 is typically represented as: '0<IMSI>@nai.epc.mnc<MNC>.mcc<MCC>.3gppnetwork.org'.

However, for the solution provided by communication system 10, UE 12c may additionally communicate location information to ePDG 20 including <SSID><AP_MAC_addr><GPS coordinates><Cell ID>as part of the user identity for UE 12c in a format: '0<IMSI>@<Location_information>.nai.epc.mnc<MNC>.mcc<MCC>.3gppnetwork.org'.

The presence of location information in the user identity may be indicated to ePDG 20 using two pre-defined delimiters '@' and '.nai'. In various embodiments, ePDG 20 may be configured (e.g., depending on operator policy) to support handling user/UE identity in both the standard format and the customized format provided by communication system 10.

The ePDG 20 may extract the location information communicated over the SWu interface may send a regular root NAI (as a user-name attribute value pair (AVP) in a DIAMETER EAP Request (DER) message) without the location information to AAA element 24 over SWm the interface.

Typically, LI-MF 48 may be connected to PCRF 36 over an X2 interface, rather than to ePDG 20 or PGW 14. Thus, the location information (e.g., SSID+AP MAC address+GPS coordinates+Cell ID) may be sent from UE 12c to ePDG 20, which can communicate the location information and the IMSI over the S2b interface to PGW 14. PGW 14 can then communicate the location information over the Gx interface to PCRF 36, which can then populate the X2 interface to LI-MF 48 with the location of UE 12c. In various embodiments, LI-MF 48 may communicate the location of UE 12c to one or more mediation devices and/or one or more law enforcement agencies.

As noted, ePDG 20 may communicate the location information and the IMSI of the user associated with UE 12c to PGW 14 over the S2b interface. Presently, a User Location Information (ULI) information element (IE) is not defined for the S2b interface, but is present for the S5/S8 interface between PGW 14 and SGW 28. Thus, in some embodiments, ePDG 20 can be configured to send the location information to PGW 14 as part of a private IE contained in a create session request message to PGW 14 when using a GTP version 2 (GTPv2) based S2b implementation. In other embodiments, for example, for PMIPv6 based S2b implementations, ePDG 20 can be configured to communicate the location information to PGW 14 using a vendor specific option (VSO) (e.g., a vendor specific mobility option), which may be included in a Proxy Binding Update (PBU) message communicated to PGW 14. PGW 14 can include the location information received over the S2b interface in Gx messages communicated to PCRF 36 over the Gx interface.

Thus, the solution provided by communication system 10 may provide a unique mechanism/technique for communicating user location information over the SWu interface without modification of IKEv2 exchanges and may also utilize a private extension IE (e.g., for GTPv2) and/or VSO (e.g., for PMIPv6) for communicating user location information to PGW 14 and subsequently PCRF 36 for LI procedure purposes.

Accordingly, the solution provided by communication system 10 may provide for several advantages over present systems, including, but not limited to, the ability to enforce lawful intercept by providing location information of UE including the SSID of untrusted non-3GPP IP access network 62, the AP MAC address of the AP to which the UE is connected, GPS coordinates of the UE and Cell ID over an untrusted wireless/WiFi AP to the LTE EPC core nodes (e.g., PGW, PCRF, etc.) without any additional message exchanges utilizing existing IEs provided by 3GPP standards. Additionally, the location information can also be utilized by a CSP/operator to perform data analytics for system, subscriber, and/or access point optimizations. Moreover, data mining can be performed by a location database maintenance entity (e.g., PCRF 36 or other CSP node) utilizing the cluster information of SSID, AP MAC address, GPS coordinates and Cell ID information in order to verify location information provided by UE as well as detect AP MAC address tampering (e.g. potentially invalid AP MAC addresses) based on existing data mining results for similar AP MAC address records for previous devices connected to the untrusted IP access network 62.

In some embodiments, UE 12c may be changing locations in untrusted non-3GPP IP access network 62. For example, UE 12c may be moving between multiple wireless radio APs in the access network. As UE 12c may move, its location information including <SSID><AP MAC><GPS coordinates><Cell ID>information may change. In such scenarios, when UE 12c sends a re-authentication request to ePDG including its location information, the ePDG may forward the information to PGW 14 and consequently the location information for UE 12c may be updated. For example, a look-up may be performed in the location database for the UE, which may result in a determination that an entry may already be present for the UE. As the UE may be moving within untrusted non-3GPP IP access network 62, the location entry/record for the UE may be updated and/or appended.

The EPC generally comprises an MME, an SGSN, an SGW, a PGW and a PCRF. The components may be used to provide various UE services and/or functions and to implement QoS on packet flows. The services and functions may be used, for example, to provision enhanced services such as enhanced charging, stateful firewalls and/or traffic performance optimization (TPO). The MME is the primary control element for the EPC. Among other things, the MME provides for UE tracking and paging procedures including, for example, retransmissions, tracking area list management, idle mode UE tracking, etc. For example, the MME can maintain tracking information for UE regarding previous and current information for UE transitions between or within Radio Access Networks (RANs). The MME further provides for UE bearer procedures including activation, deactivation and modification; SGW and PGW selection for UE and authentication services. The SGW is a data plane element that can manage user mobility and interfaces with RANs. The SGW also maintains data paths between eNodeBs and the PGW. The PGW provides IP-CAN session connectivity for UEs to external packet data networks (PDNs), such as, for example an internet. The SGSN may provide access for legacy universal mobile telecommunications systems (UMTS) network devices. For example, UE on the GERAN can communicate through the SGSN to the SGW or the PGW, which can include a gateway GPRS support node (GGSN) to support communication with legacy systems that may include GnGp-SGSNs.

Radio Access Networks (RANs) in an EPS architecture consist of eNodeBs (also known as eNBs) for 4G/LTE access and/or NodeBs (also known as NBs) for 3G access. An eNodeB is generally connected directly to an EPC, as well as to adjacent eNodeBs. Connections with adjacent eNodeBs may allow calls to be routed more directly. An eNodeB is also responsible for selecting an MME for UE, managing radio resources, and making handover decisions for UE.

PCRF 36 may decide policy control and/or charging activities to apply to UE based on various PCC rules. PCRF 36 can be configured to use user subscription information as a basis for the policy and charging control decisions. The subscription information may apply for both session-based and non-session based services. For example, PCRF 36 may determine PCC rules based on an application or service described to the PCRF from an application function (AF), CCF 42, OFCS 44 and/or ANDSF 46. Such functions and others similar to these may describe applications/services to PCRF 36 that may require dynamic policy and/or charging control for one or more UE. The dynamic policy and/or charging controls may include, but not be limited to, controlling the detection for service data flows, setting charging instructions for service data flows, setting QoS levels for service data flows and/or gating. As referred to herein in this Specification, PCRF 36 may be referred to generally as a policy server. PCRF 36 may communicate PCC rules to PGW 14. PGW 14 may serve as policy enforcement points to manage QoS, online/offline flow-based charging, data generation, deep-packet inspection and intercept.

3GPP AAA element 24 is a network element responsible for accounting, authorization and authentication functions for UE 12a-12c. For AAA considerations, AAA element 24 may provide a mobile node IP address and the accounting session identification (Acct-Session-ID) and other mobile node states in appropriate messaging (e.g., via access-Request/access-Response messages). Authentication refers to the process where an entity's identity is authenticated, typically by providing evidence that it holds a specific digital identity such as an identifier and the corresponding credentials. The authorization function determines whether a particular entity is authorized to perform a given activity, typically inherited from authentication when logging on to an application or service.

Authorization may be determined based on a range of restrictions, for example time-of-day restrictions, or physical location restrictions, or restrictions against multiple accesses by the same entity or user. Accounting refers to the tracking of network resource consumption by users for the purpose of capacity and trend analysis, cost allocation, billing, etc. In addition, it may record events such as authentication and authorization failures, and include auditing functionality, which permits verifying the correctness of procedures carried out based on accounting data. In various embodiments, communication system 10 may be provisioned with other AAA services and/or AAA servers, which may provide AAA considerations for the system.

HSS 18 offers a subscriber database in 3GPP (e.g., GSM, LTE, etc.) environments. In one sense, HSS 18 can provide functions similar to those offered by an AAA element server in a CDMA environment. When a UE moves to 3GPP access, HSS 18 can be aware of this location and the user's PDN anchor point (e.g., PGW 14). Additionally, HSS 18 can communicate with AAA element 24 such that when a UE moves to a CDMA environment, it still has an effective anchor for communications (e.g., PGW 14). HSS 18, AAA element 24 and PCRF 36 can coordinate state information for the UE (and synchronize this information) to achieve mobility within the system.

UE 12a-12c can be associated with clients or customers wishing to initiate a flow in communication system 10 via some network. The terms 'user equipment', 'mobile node', 'end user', 'and 'subscriber' are inclusive of devices used to initiate a communication, such as a computer, a personal digital assistant (PDA), a laptop or electronic notebook, a cellular telephone, an i-Phone®, i-Pad®, a Google® Droid® phone, an IP phone, or any other device, component, element, or object capable of initiating voice, audio, video, media, or data exchanges within communication system 10. UE 12a-c may also be inclusive of a suitable interface to the human user such as a microphone, a display, a keyboard, or other terminal equipment. UE 12a-c may also be any device that seeks to initiate a communication on behalf of another entity or element such as a program, a database, or any other component, device, element, or object capable of initiating an exchange within communication system 10. Data, as used herein in this Specification, refers to any type of numeric, voice, video, media, or script data, or any type of source or object code, or any other suitable information in any appropriate format that may be communicated from one point to another. In certain embodiments, UE 12a-12c may have a bundled subscription for network access and application services (e.g., voice, data), etc. Once the access session is established, the user can register for application services as well, without additional authentication requirements. There can be two different user data repositories (e.g., AAA databases): one for the access user profile and one for the application user profile. IP addresses can be assigned using dynamic host configuration protocol (DHCP), Stateless Address Auto-configuration, default bearer activation, etc., or any suitable variation thereof.

Figure 2A:
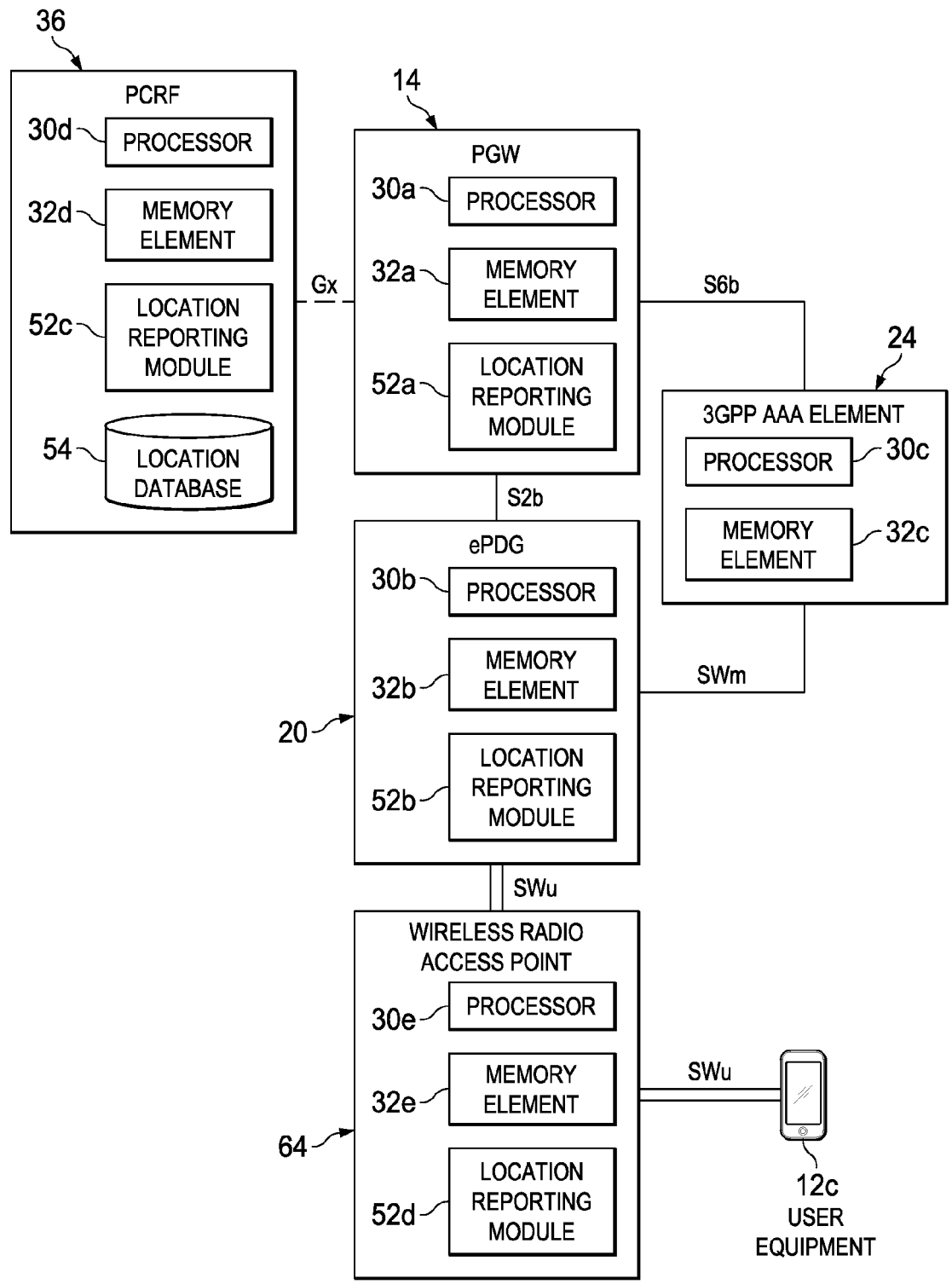
FIGS. 2A-2B are simplified block diagrams illustrating additional details associated with potential embodiments of the communication system.
Figure 2B:
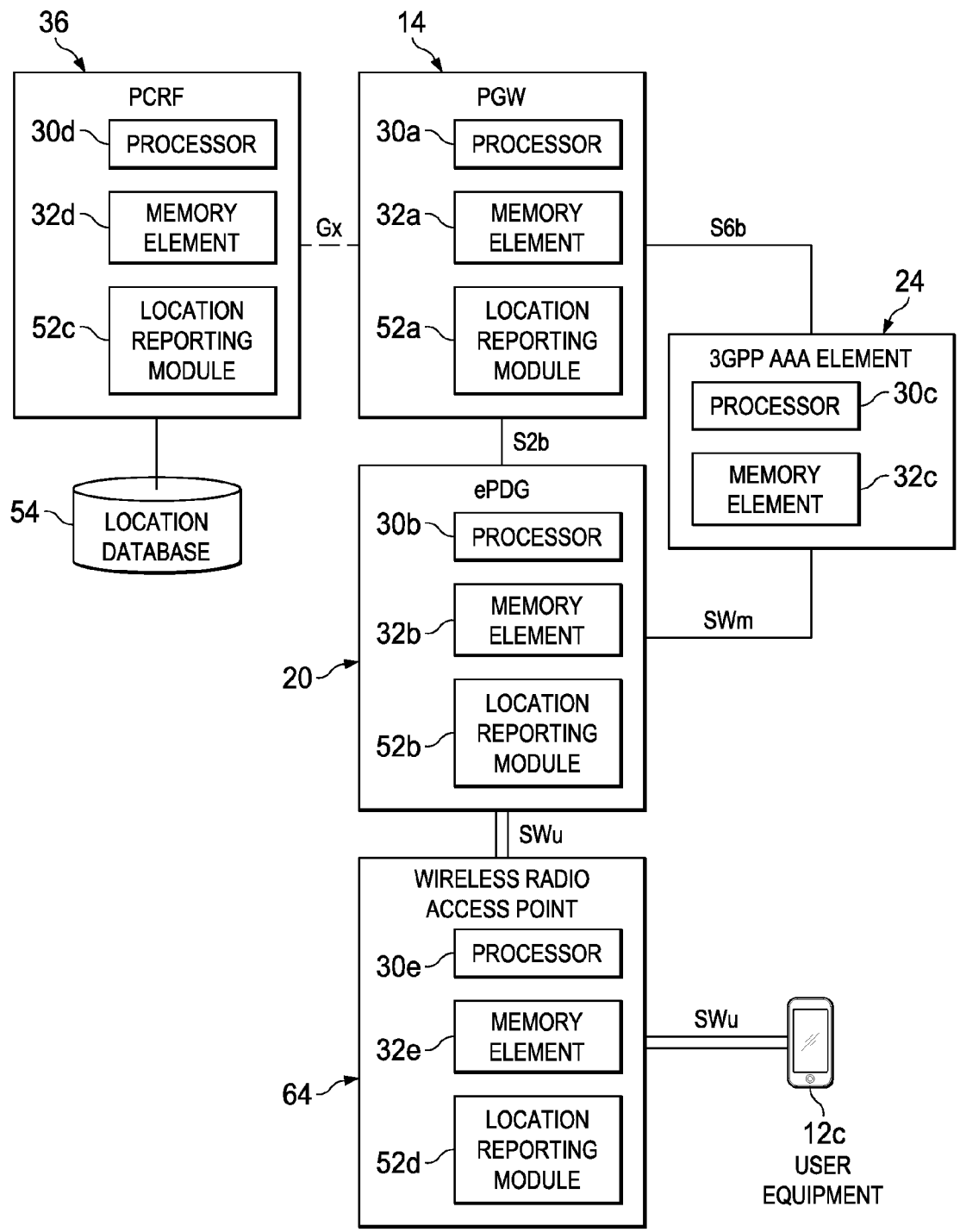

Turning to FIGS. 2A-2B, FIGS. 2A-2B are simplified block diagrams illustrating additional details associated with potential embodiments of communication system 10. FIGS. 2A-2B include PGW 14, ePDG 20, AAA element 24, PCRF 36 and wireless radio AP 64 of communication system 10. Each of these elements may include a respective processor 30a-30e and a respective memory element 32a-32e. PGW 14, ePDG 20, PCRF 36 and wireless radio AP 64 may each additionally include a respective location reporting module 52a-52d. As shown in FIG. 2A, PCRF 36 may additionally include a location database 54. FIG. 2B differs from FIG. 2A in that, as shown in FIG. 2B, location database 54 can be located external to PCRF 54 in various embodiments. Thus, as shown in FIGS. 2A-2B, PCRF 36 can be in communication with location database 54 either internally or externally. In various embodiments, location database 54 can be located in another network element, gateway, etc. or can be shared and/or maintained across multiple network elements, gateways, etc. Hence, appropriate software and/or hardware is being provisioned in PGW 14, ePDG 20, AAA element 24, PCRF 36 and wireless radio AP 64 in order to facilitate providing location reporting in an untrusted IP access network of communication system 10. Note that in certain examples, certain databases (e.g., for storing UE location information) can be consolidated with memory elements (or vice versa), or the storage can overlap/exist in any other suitable manner. UE 12c is also shown in FIGS. 2A-2B.

In one example implementation, PGW 14, ePDG 20, AAA element 24, PCRF 36 and wireless radio AP 64 are network elements, which are meant to encompass network appliances, servers, routers, switches, gateways, bridges, loadbalancers, firewalls, processors, modules, or any other suitable device, component, element, or object operable to exchange information that facilitates or otherwise helps to provide for location reporting (e.g., for a network as illustrated in FIGS. 2A-2B). In other embodiments, these operations and/or features may be provided external to these elements, or included in some other network device to achieve this intended functionality. Alternatively, one or more of these elements can include software (or reciprocating software) that can coordinate in order to achieve the operations and/or features, as outlined herein. In still other embodiments, one or more of these devices may include any suitable algorithms, hardware, software, components, modules, interfaces, or objects that facilitate the operations thereof. This may be inclusive of appropriate algorithms and communication protocols that allow for the effective exchange of data or information. In other embodiments, DIAMETER routing agents (DRAs) may interface between network elements in order to provide DIAMETER routing procedures for DIAMETER-based messages.

In regards to the internal structure associated with communication system 10, each of PGW 14, ePDG 20, AAA element 24, PCRF 36 and wireless radio AP 64 can include memory elements for storing information to be used in achieving the location reporting activities, as outlined herein. Additionally, each of these devices may include a processor that can execute software or an algorithm to perform the location reporting activities as discussed in this Specification. These devices may further keep information in any suitable memory element [e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term "memory element." The information being tracked or sent to PGW 14, ePDG 20, AAA element 24, PCRF 36 and wireless radio AP 64 could be provided in any database, register, control list, cache, or storage structure: all of which can be referenced at any suitable timeframe. Any such storage options may be included within the broad term "memory element" as used herein. Similarly, any of the potential processing elements, modules, and machines described herein should be construed as being encompassed within the broad term "processor." Each of the network elements and user equipment (e.g., mobile nodes) can also include suitable interfaces for receiving, transmitting, and/or otherwise communicating data or information in a network environment.

Note that in certain example implementations, the location reporting techniques as outlined herein may be implemented by logic encoded in one or more tangible media, which may be inclusive of non-transitory media (e.g., embedded logic provided in an ASIC, in digital signal processing (DSP) instructions, software [potentially inclusive of object code and source code] to be executed by a processor, or other similar machine, etc.). In some of these instances, memory elements [as shown in FIGS. 2A-2B] can store data or information used for the operations described herein. This includes the memory elements being able to store software, logic, code, or processor instructions that are executed to carry out the activities described herein.

A processor can execute any type of instructions associated with the data or information to achieve the operations detailed herein. In one example, the processors [as shown in FIGS. 2A-2B] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP processor, an EPROM, an electrically erasable PROM (EEPROM)) or an ASIC that includes digital logic, software, code, electronic instructions, or any suitable combination thereof.

In some cases, a wireless radio AP may be mobile. For example, a first UE in an untrusted IP access network may be connected to the LTE EPC via the ePDG and may provide its wireless (e.g., WiFi) connection to a second UE. The first UE may then move around in the system, thereby location information reported by the second UE may be changing. Communication system 10 may provide additional solutions for handling UE location information when connected to a mobile wireless radio AP.

Figure 3:
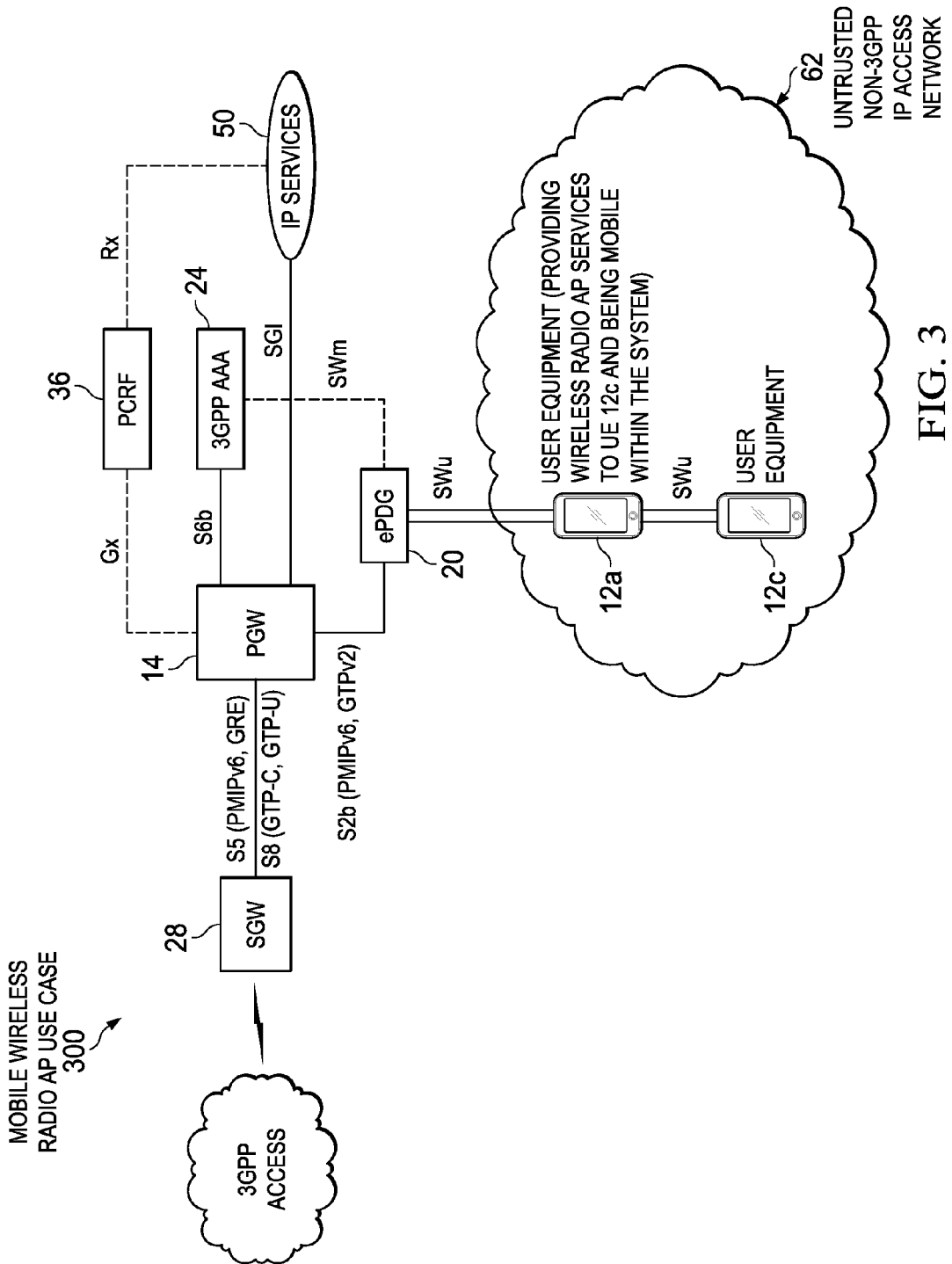
FIG. 3 is a simplified block diagram illustrating example details associated with an example use case in a particular implementation of the communication system.

Turning to FIG. 3, FIG. 3 is a simplified block diagram illustrating example details associated with an example mobile wireless radio AP use case 300 in a particular implementation of the communication system. FIG. 3 includes UE 12a, UE 12c, PGW 14, ePDG 20, 3GPP AAA element 24, PCRF 36 and SGW 28 and PCRF 36. Also shown in FIG. 3 are IP services 50 which may interface with PGW 14 and PCRF 36. Additionally shown in FIG. 3 is untrusted non-3GPP IP access network 62.

As shown in FIG. 3, UE 12a may be providing wireless radio AP to UE 12c in untrusted IP access network 62 across the SWu interface and may be communication with the LTE EPC core via ePDG 20 via the SWu interface. Assume, for purposes of the example use case 300 that UE 12a may be moving or mobile within untrusted IP access network 62. Thus, location information reported for UE 12c may indicate changing locations for the UE in relation to the wireless radio AP (e.g., UE 12a) to which its wireless connection may be established.

Recall, as discussed above, that solutions provided by communication system 10 can provide for determining invalid or potentially invalid location information for a UE (e.g., potentially invalid AP MAC address, potentially invalid UE location, etc.) based on comparisons for location information received from a UE in comparison to location information for other UE stored in the location database (e.g., location database 54 as shown in FIGS. 2A-2B). Because UE 12a can be mobile, locations reported by UE 12c can be changing, which could potentially cause the location information reported by UE 12c to be identified as potentially invalid by an entity maintaining the location database (e.g., PCRF 36).

However, this potential problem when handling changing locations reported by a UE can be overcome by tracking cell ID information contained within location information reported by the UE. Recall, location information reported by a UE can include SSID of an untrusted non-3GPP IP access network, an AP MAC address for an AP to which the UE is connected, a location for the UE and cell ID information for the UE for one or more cells that may be serving and/or seen by the UE.

As UE 12c and UE 12a are moving within the system, the serving macro cell ID (e.g., a 3GPP serving macro cell) can change. Upon transitioning between macro cells, UE 12c may initiate an IKE reauthentication. The IKE reauthentication may include new location information reported by UE 12c, which may include updated cell ID information for macro cells serving and/or seen by UE 12a. Upon receiving the location information for UE 12c, PCRF 36 may query the location database for previously stored location information for the UE. A comparison between previously stored cell ID information for the UE for the same AP MAC address (e.g., AP MAC address of UE 12a) may indicate that UE 12c and UE 12a are moving/transitioning locations within the system. Based on the comparison and a determination that the UE are moving, location information reported by UE 12c may not be marked or flagged as potentially invalid, but rather used to further populate (e.g., update and/or append) the location database and/or tracked for future comparisons.

Figure 4:
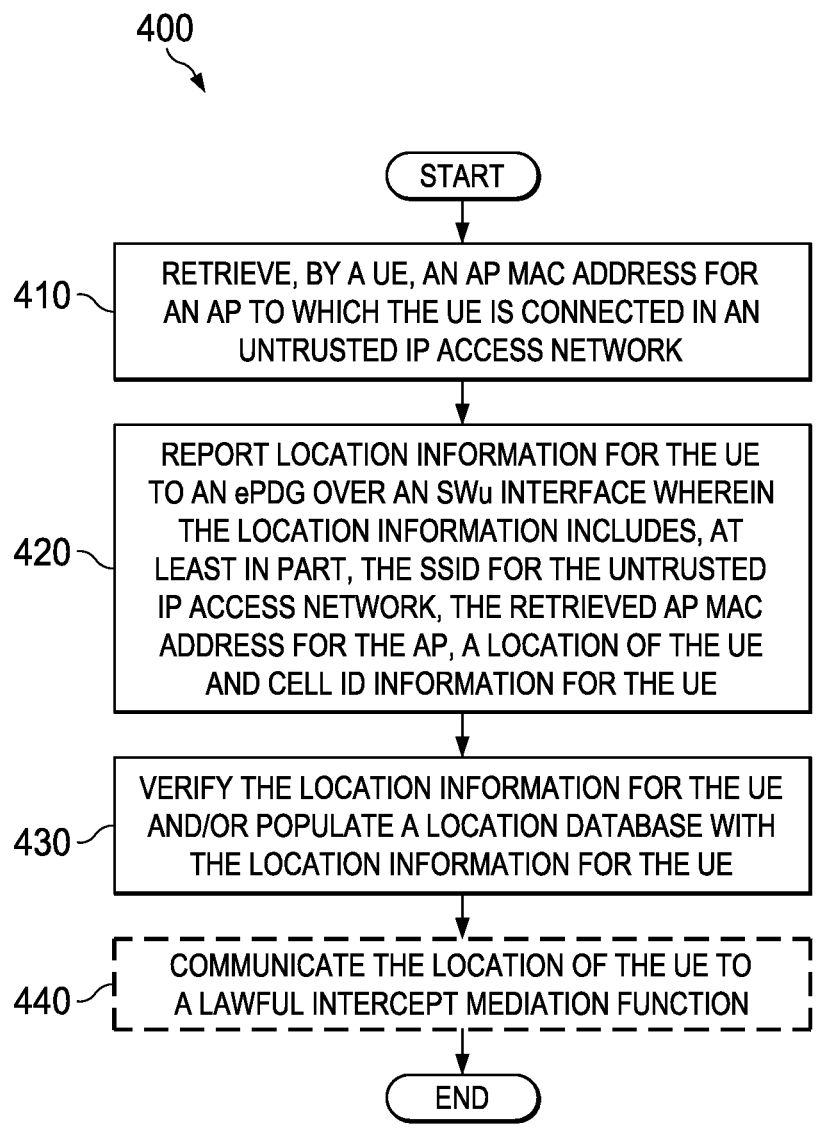
FIG. 4 is a simplified flow diagram illustrating example operations associated with location reporting in an untrusted network environment in accordance with one potential embodiment of the communication system.

Turning to FIG. 4, FIG. 4 is a simplified flow diagram 400 illustrating example operations associated with location reporting in an untrusted network in one example embodiment of communication system 10. In one example embodiment, these operations may be carried out using UE 12c (or any other UE served by the system), wireless radio AP 64 (and/or a UE providing wireless AP services) in untrusted non-3GPP IP access network 62, ePDG 20, PGW 14, PCRF 36 and a location database (e.g., location database 54 as shown in FIGS. 2A-2B). In some embodiments, these operations may additionally be carried out using LI-MF 48.

Processing may begin when a particular UE (e.g., UE 12*c*) seeks to initiate connectivity with the EPC through an untrusted IP access network via wireless radio AP 64 and ePDG 20, as shown in FIG. 1. Thus, processing may start at 410 when the UE may retrieve the MAC address of AP 64 to which the UE is wirelessly connected. At 420, location information for UE 12*c* may be reported to ePDG 20 over an SWu interface. The location information for UE 12*c* may include, at least in part, the SSID for untrusted non-3GPP IP access network 62, the AP MAC address for AP 64, a location of the UE (e.g., GPS coordinates representing the location of the UE) and cell ID information for the UE (e.g., 3GPP macro cell information for one or more macro cells serving and/or seen by the UE).

At 430, the location information reported for the UE may be verified and/or the location database may be populated (e.g., updated and/or appended) with the location information for the UE. The location database may include, at least in part, location information for other UE in the untrusted IP access network. In one or more embodiments, the location database may additionally be populated with device name information and address information for the UE as well as other UE in the untrusted IP access network. In one or more embodiments, the location of the UE can be communicated to LI-MF 48 over the X2 interface at 440.

Figure 5:
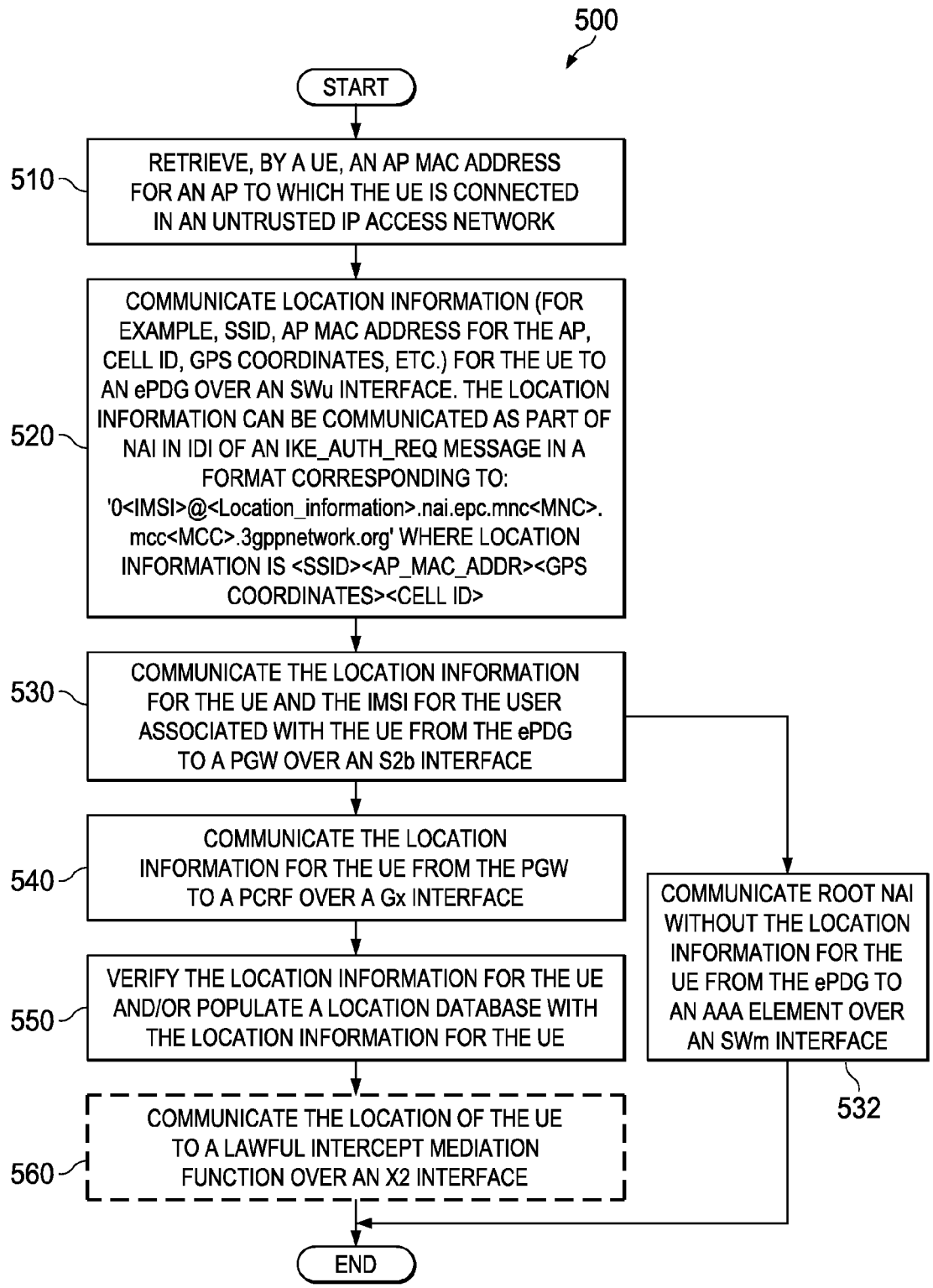
FIG. 5 is a simplified flow diagram illustrating other example operations associated with location reporting in an untrusted network environment in accordance with one potential embodiment of the communication system.

Turning to FIG. 5, FIG. 5 is a simplified flow diagram 500 illustrating other example operations associated with location reporting in an untrusted network in one example embodiment of communication system 10. In one example embodiment, these operations may be carried out using UE 12*c* (or any other UE in the system), wireless radio AP 64 (and/or a UE providing wireless AP services), ePDG 20, PGW 14, PCRF 36 and a location database (e.g., location database 54 as shown in FIGS. 2A-2B). In some embodiments, these operations may additionally be carried out using LI-MF 48.

Processing may begin when a particular UE (e.g., UE 12*c*) seeks to initiate connectivity with the EPC through an untrusted IP access network via wireless radio AP 64 and ePDG 20, as shown in FIG. 1. Thus, processing may start at 510 when the UE may retrieve the MAC address of AP 64 to which the UE is wirelessly connected. At 520, location information for the UE may be communicated from the UE to ePDG 20 over the SWu interface. The location information for the UE may include, at least in part, the SSID for untrusted non-3GPP IP access network 62, the AP MAC address for AP 64, a location of the UE (e.g., GPS coordinates representing the location of the UE) and cell ID information for the UE (e.g., 3GPP macro cell information for one or more macro cells serving and/or seen by the UE). The location information can be sent as part of NAI in the Idi of an IKE_AUTH_REQ message in a format: '0<IMSI>@<Location_information>.nai.epc.mnc<MNC>.mcc<MCC>.3gppnetwork.org' where the location information is included as '<SSID><AP_MAC_ADDR><GPS COORDINATES><CELL ID>'.

At 530, ePDG 20 may communicate the location information from the UE and the IMSI of the user associated with the UE to PGW 14 over the S2b interface. In various embodiments, the location information can be communicated using a private extension when using a GTPv2 S2b implementation and/or can be communicated using a VSO contained in a PBU when using a PMIPv6 S2b implementation. At 532, ePDG 20 may communicate the Root NAI for the user without location information for the UE to AAA element 24 over the SWm interface.

At 540, the location information for the UE can be communicated from PGW 14 to PCRF 36, which may be maintaining the location database, over the Gx interface. Note, the location information for the UE can be communicated to any network element that may be maintaining the location database. At 550, PCRF 36 may verify the location information reported for the UE (e.g., to determine if the AP MAC address of AP 64 is invalid or potentially invalid and/or if an invalid or potentially invalid location is being reported for the UE) and/or populate (e.g., updated and/or appended) the location database with the location information for the UE. The location database may include, at least in part, location information for other UE in the untrusted IP access network. In one or more embodiments, the location database may additionally be populated with device name information and address information for the UE as well as other UE in the untrusted IP access network. In one or more embodiments, the location of the UE can be communicated to LI-MF 48 over the X2 interface at 560.

Figure 6:
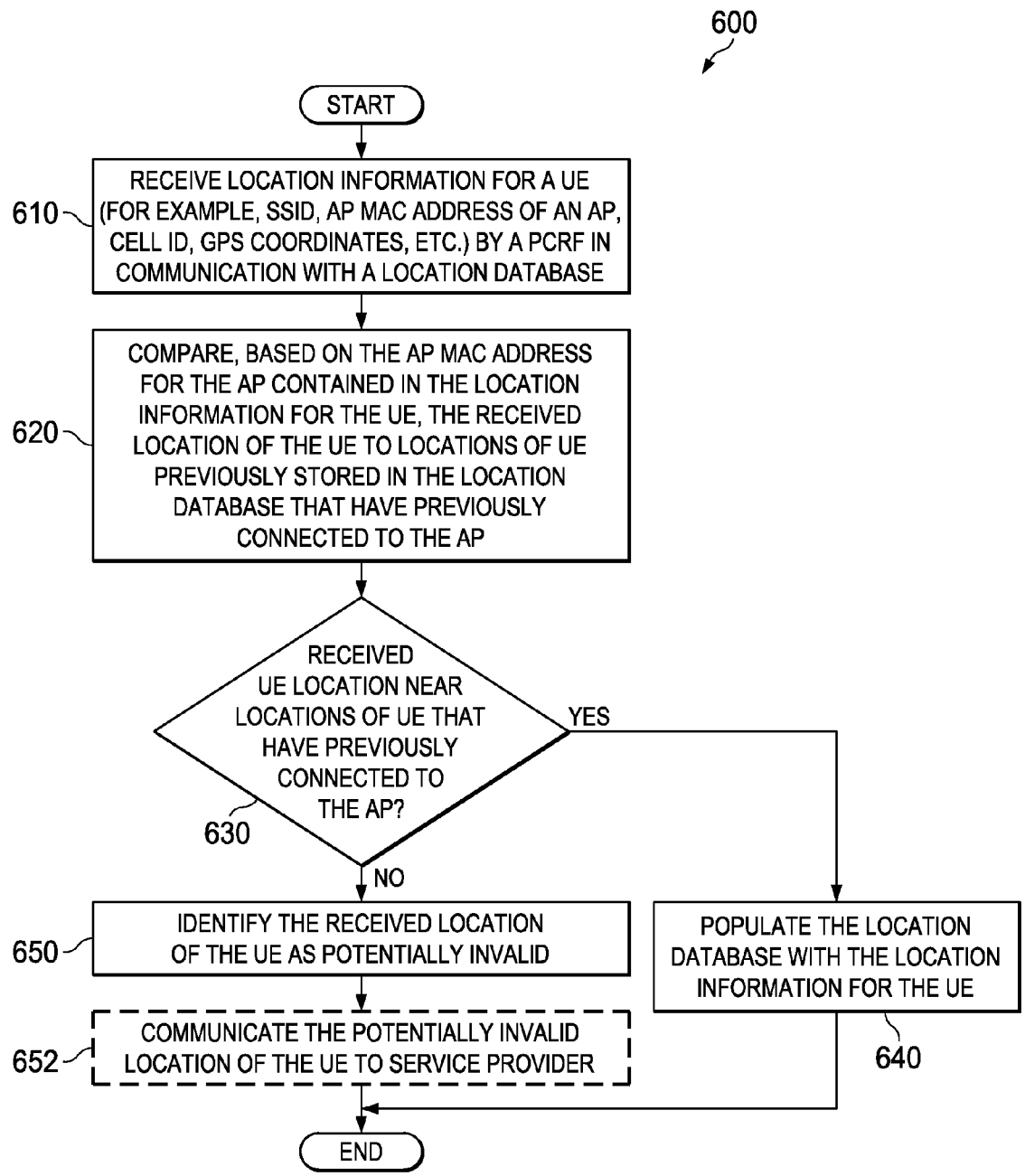
FIGS. 6-9 are simplified flow diagrams illustrating example operations associated with verifying location information reported for user equipment in an untrusted network environment in accordance with various potential embodiments of the communication system.

Turning to FIG. 6, FIG. 6 is a simplified flow diagram 600 illustrating example operations associated with verifying location information received for a UE in an untrusted network in one example embodiment of communication system 10. In one example embodiment, these operations may be carried out using PCRF 36 and a location database (e.g., location database 54 as shown in FIGS. 2A-2B) using location information received for UE 12*c* (and/or any other UE in the system), which may be communicated to PCRF 36 through the system using wireless radio AP 64 (and/or a UE providing wireless AP services), ePDG 20 and PGW 14. In one or more embodiments, the example operations shown in FIG. 6 may be used to identify whether a location for a given UE received in location information for the UE may be invalid or potentially invalid.

Processing may begin when location information for a particular UE (e.g., UE 12*c*) may be received by PCRF 36, thus processing may start at 610 when PCRF 36, which may be in communication with the location database (e.g., either internal or external to PCRF 36), receives location information for the UE. The location information can include an SSID for untrusted non-3GPP IP access network 62, an AP MAC address for AP 64, a cell ID for the UE, GPS coordinates for the UE, etc.). At 620, PCRF 36 may compare, based on the AP MAC address for AP 64 contained in the location information for the UE, the received location of the UE to locations of UE previously stored in the location database that have previously connected to AP 64. For example, PCRF 36 may perform a look-up on the received AP MAC address in the location database to gather reported UE locations for UE that have previously connected to the AP. In various embodiments, the comparison to locations of UE previously stored in the location database can include comparisons between the current location received for the UE against previously received locations for the same UE (e.g., in a case where the UE may be moving between APs) as well as comparisons between the current location received for the UE against previously received locations for other UE that have previously connected to the AP.

At 630, PCRF 36 may determine whether the received location for the UE is near the corresponding locations of UE that have previously connected to AP 64. If so, PCRF 36 may populate (e.g., update or append) the location database with the location information for the UE at 640. If not, PCRF 36 may identify the received location of the UE as potentially invalid at 650. In one or more embodiments, PCRF 36 may additionally communicate the potentially invalid location received for the UE to a network service provider at 652.

Figure 7:
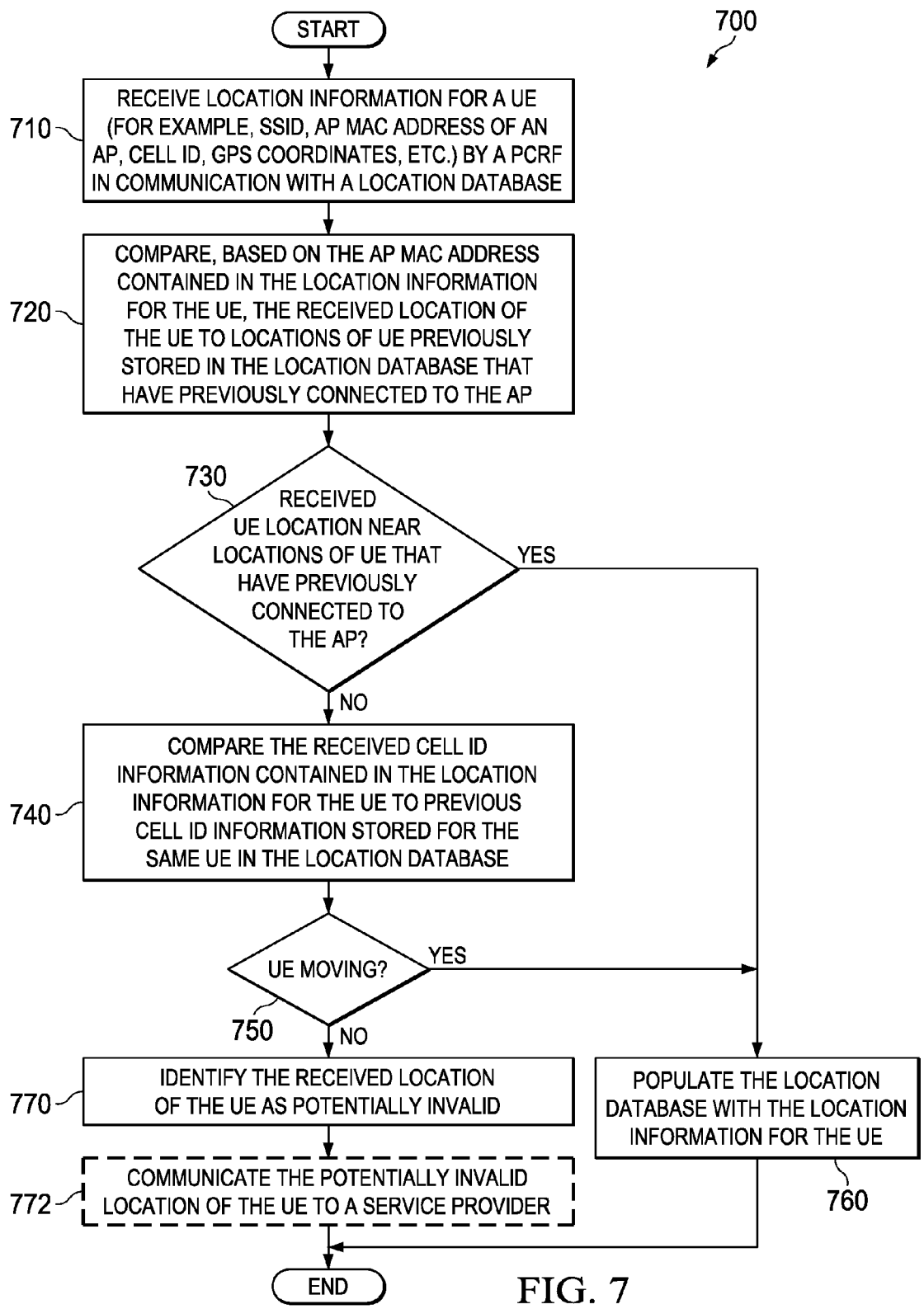

Turning to FIG. 7, FIG. 7 is a simplified flow diagram 700 illustrating other example operations associated with verifying location information received for a UE in an untrusted network in one example embodiment of communication system 10. In one example embodiment, these operations may be carried out using PCRF 36 and a location database (e.g., location database 54 as shown in FIGS. 2A-2B) using location information received for UE 12c (and/or any other UE in the system), which may be communicated to PCRF 36 through the system using a mobile wireless radio AP (e.g., UE 12a as shown in FIG. 3 providing wireless AP services), ePDG 20 and PGW 14. The example operations discussed for FIG. 7 may be largely similar to the example operations discussed for FIG. 6, however, the example operations as shown in FIG. 7 may additionally provide for handling location information for a UE when connected to the LTE EPC through a mobile wireless radio AP.

Processing may begin when location information for a particular UE (e.g., UE 12c) may be received by PCRF 36, thus processing may start at 710 when PCRF 36, which may be in communication with the location database (e.g., internal or external to the PCRF), receives location information for the UE. The location information can include an SSID for untrusted non-3GPP IP access network 62, an AP MAC address for AP 64, a cell ID for the UE, GPS coordinates for the UE, etc.). At 720, PCRF 36 may compare, based on the AP MAC address for the mobile wireless radio AP contained in the location information for the UE, the received location of the UE to locations of UE previously stored in the location database that have previously connected to the mobile wireless radio AP. For example, PCRF 36 may perform a look-up on the received AP MAC address in the location database to gather reported UE locations for UE that have previously connected to the AP. In various embodiments, the comparison to locations of UE previously stored in the location database can include comparisons between the current location received for the same UE against previously received locations for the UE as well as comparisons between the current location received for the UE against previously received locations for other UE that have previously connected to the mobile wireless radio AP.

At 730, PCRF 36 may determine whether the received location for the UE is near the corresponding locations of UE that have previously connected to the mobile wireless radio AP. If so, PCRF 36 may populate (e.g., update and/or append) the location database with the location information received for the UE at 760.

If not, PCRF 36 may compare the received cell ID information contained in the location information reported for the UE to previous cell ID information stored for the same UE in the location database at 740. Based on the comparison, PCRF 36 may determine at 750 whether the UE is moving (e.g., the mobile wireless radio AP is also moving). If PCRF 36 determines that the UE is moving, then PCRF 36 may populate (e.g., update and/or append) the location database with the location information received for the UE at 760. If PCRF 36 determines that the UE is not moving, then PCRF 36 may identify the received location of the UE as potentially invalid at 770. In one or more embodiments, PCRF 36 may additionally communicate the potentially invalid location received for the UE to a network service provider at 772.

Figure 8:
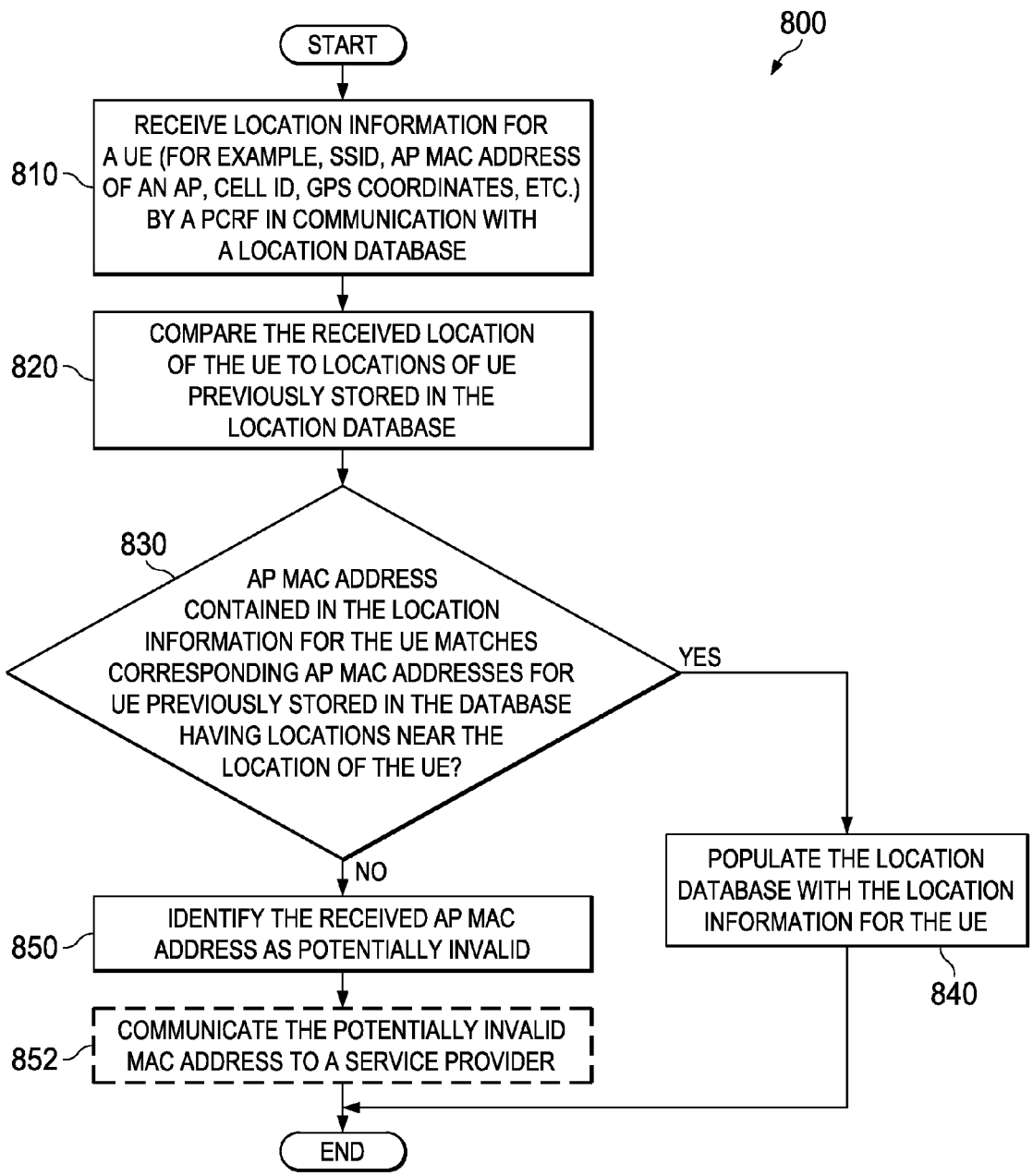

Turning to FIG. 8, FIG. 8 is a simplified flow diagram 800 illustrating example operations associated with verifying location information received for a UE in an untrusted network in one example embodiment of communication system 10. In one example embodiment, these operations may be carried out using PCRF 36 and a location database (e.g., location database 54 as shown in FIGS. 2A-2B) using location information received for UE 12c (and/or any other UE in the system), which may be communicated to PCRF 36 through the system using wireless radio AP 64 (and/or a UE providing wireless AP services), ePDG 20 and PGW 14. In one or more embodiments, the example operations shown in FIG. 8 may be used to identify whether an AP MAC address received in location information for a given UE may be invalid or potentially invalid (e.g., may have been tampered with by the UE or another device in the system).

Processing may begin when location information for a particular UE (e.g., UE 12c) may be received by PCRF 36, thus processing may start at 810 when PCRF 36, which may be in communication with the location database (e.g., either internally or externally), receives location information for the UE. The location information can include an SSID for untrusted non-3GPP IP access network 62, an AP MAC address for AP 64, a cell ID for the UE, GPS coordinates for the UE, etc.). At 820, PCRF 36 may compare the received location of the UE to locations of UE previously stored in the location database. For example, PCRF 36 may perform a look-up on the received UE location to locations for UE that have previously been stored in the database. In various embodiments, the comparison to locations of UE previously stored in the location database can include comparisons between the current location received for the UE against previously received locations for the same UE as well as comparisons between the current location received for the UE against previously received locations for other UE.

At 830, PCRF 36 may determine whether the AP MAC address contained in the location information for the UE matches corresponding AP MAC addresses for UE previously stored in the location database that have locations near the received location for the UE. If so, PCRF 36 may populate (e.g., update and/or append) the location database with the location information received for the UE at 840. If not, PCRF 36 may identify the received AP MAC address as potentially invalid at 850. In one or more embodiments, PCRF 36 may additionally communicate the potentially invalid AP MAC address to a network service provider at 852.

Figure 9:
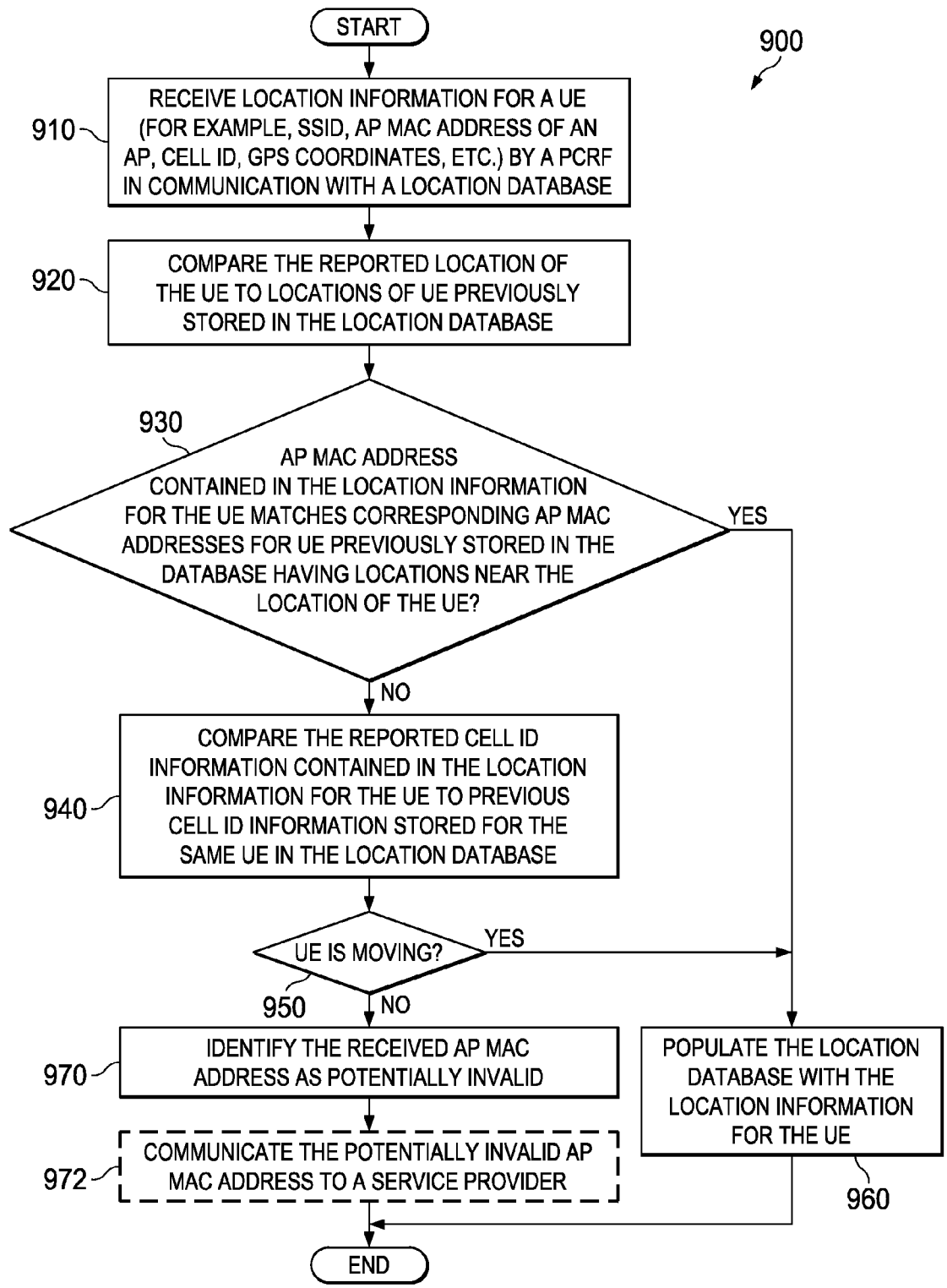

Turning to FIG. 9, FIG. 9 is a simplified flow diagram 900 illustrating other example operations associated with verifying location information received for a UE in an untrusted network in one example embodiment of communication system 10. In one example embodiment, these operations may be carried out using PCRF 36 and a location database (e.g., location database 54 as shown in FIGS. 2A-2B) using location information received from UE 12c (and/or any other UE in the system), which may be communicated to PCRF 36 through the system using a mobile wireless radio AP (e.g., UE 12a as shown in FIG. 3 providing wireless AP services), ePDG 20 and PGW 14. The example operations discussed for FIG. 9 may be largely similar to the example operations discussed for FIG. 8, however, the example operations as shown in FIG. 9 may additionally provide for handling location information for a UE when connected to the LTE EPC through a mobile wireless radio AP.

Processing may begin when location information for a particular UE (e.g., UE 12c) may be received by PCRF 36, thus processing may start at 910 when PCRF 36, which may be in communication with the location database (e.g., internal or external to the PCRF), receives location information for the UE. The location information can include an SSID for untrusted non-3GPP IP access network 62, an AP MAC address for AP 64, a cell ID for the UE, GPS coordinates for the UE, etc.). At 920, PCRF 36 may compare the received location of the UE to locations of UE previously stored in the location database. For example, PCRF 36 may perform a look-up on the received UE location to locations for UE that have previously been stored in the database. In various embodiments, the comparison to locations of UE previously stored in the location database can include comparisons between the current location received for the UE against previously received locations for the same UE as well as comparisons between the current location received for the UE against previously received locations for other UE.

At 930, PCRF 36 may determine whether the AP MAC address contained in the location information for the UE matches corresponding AP MAC addresses for UE previously stored in the location database that have locations near the received location for the UE. If so, PCRF 36 may populate (e.g., update and/or append) the location database with the location information received for the UE at 960.

If not, PCRF 36 may compare the received cell ID information contained in the location information received for the UE to previous cell ID information stored for the same UE in the location database at 940. Based on the comparison, PCRF 36 may determine at 950 whether the UE is moving. If PCRF 36 determines that the UE is moving, then PCRF 36 may populate (e.g., update and/or append) the location database with the location information received for the UE at 960. If PCRF 36 determines that the UE is not moving, then PCRF 36 may identify the received AP MAC address as potentially invalid at 970. In one or more embodiments, PCRF 36 may additionally communicate the potentially invalid location reported for the UE to a network service provider at 972.

Note that with the examples provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in the appended diagrams illustrate only some of the possible signaling scenarios and patterns that may be executed by, or within, communication system 10. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings provided herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   receiving location information for a user equipment (UE), wherein the location information includes, at least in part, a location of the UE, a Media Access Control (MAC) address for a particular access point (AP) to which the UE is connected in an untrusted access network and a cell identifier (ID) for a macro cell;
   determining that at least one of the location of the UE or the MAC address included in the location information is potentially invalid;
   comparing the cell ID for the macro cell received in the location information to cell IDs previously received for the UE for the location;
   determining whether the UE is moving based on the comparison; and
   populating a location database with the location information for the UE if the UE is determined to be moving.

2. The method of claim 1, wherein the UE is connected to the macro cell or is capable of measuring signals transmitted by the macro cell.

3. The method of claim 1, wherein the UE is determined to be moving if the cell ID for the macro cell received in the location information matches a particular cell ID previously received for the UE for the location.

4. The method of claim 1, wherein the location of the UE included in the location information is determined to be potentially invalid if it is not near locations received for other UE that previously connected to the particular AP.

5. The method of claim 4, further comprising:
   identifying the location as a potentially invalid location if the UE is determined not to be moving.

6. The method of claim 5, further comprising:
   communicating the potentially invalid location to a service provider if the UE is determined not to be moving.

7. The method of claim 1, wherein the MAC address included in the location information is determined to be potentially invalid if it does not match MAC addresses received for other UE at locations near the location included in the location information received for the UE.

8. The method of claim 7, further comprising:
   identifying the location as a potentially invalid location if the UE is determined not to be moving.

9. The method of claim 8, further comprising:
   communicating the potentially invalid location to a service provider if the UE is determined not to be moving.

10. The method of claim 1, wherein the particular AP is another UE.

11. The method of claim 1, further comprising:
    embedding the location information received for the UE using a Network Access Identifier (NAI) as part of an identity initiator of an Internet Key Exchange (IKE) Authentication Request (IKE_AUTH_REQ) message.

12. One or more non-transitory tangible media encoding logic that includes instructions for execution that when executed by a processor, is operable to perform operations comprising:
  receiving location information for a user equipment (UE), wherein the location information includes, at least in part, a location of the UE, a Media Access Control (MAC) address for a particular access point (AP) to which the UE is connected in an untrusted access network and a cell identifier (ID) for a macro cell;
  determining that at least one of the location of the UE or the MAC address included in the location information is potentially invalid;
  comparing the cell ID for the macro cell received in the location information to cell IDs previously received for the UE for the location;
  determining whether the UE is moving based on the comparison; and
  populating a location database with the location information for the UE if the UE is determined to be moving.

13. The media of claim 12, wherein the UE is determined to be moving if the cell ID for the macro cell received in the location information matches a particular cell ID previously received for the UE for the location.

14. The media of claim 12, wherein the location of the UE included in the location information is determined to be potentially invalid if it is not near locations received for other UE that previously connected to the particular AP.

15. The media of claim 12, wherein the MAC address included in the location information is determined to be potentially invalid if it does not match MAC addresses received for other UE at locations near the location included in the location information received for the UE.

16. The media of claim 12, the operations further comprising:
  embedding the location information received for the UE using a Network Access Identifier (NAI) as part of an identity initiator of an Internet Key Exchange (IKE) Authentication Request (IKE_AUTH_REQ) message.

17. A system comprising:
  a Policy and Charging Rules Function (PCRF) comprising at least one memory element for storing data and at least one processor that executes instructions associated with the data, the PCRF being adapted when executed by the at least one processor to:
    receive location information for a user equipment (UE), wherein the location information includes, at least in part, a location of the UE, a Media Access Control (MAC) address for a particular access point (AP) to which the UE is connected in an untrusted access network and a cell identifier (ID) for a macro cell;
    determine that at least one of the location of the UE or the MAC address included in the location information is potentially invalid;
    compare the cell ID for the macro cell received in the location information to cell IDs previously received for the UE for the location;
    determine whether the UE is moving based on the comparison; and
    populate a location database with the location information for the UE if the UE is determined to be moving.

18. The system of claim 17, wherein the location database is external to the PCRF.

19. The system of claim 17, wherein the UE is determined to be moving if the cell ID for the macro cell received in the location information matches a particular cell ID previously received for the UE for the location.

20. The system of claim 17, wherein the particular AP is another UE.

* * * * *